United States Patent
Haag et al.

(10) Patent No.: US 11,643,063 B2
(45) Date of Patent: May 9, 2023

(54) METHOD AND DEVICE FOR ASCERTAINING AN AVAILABLE FLUID VOLUME, BRAKING SYSTEM

(71) Applicant: Robert Bosch GmbH, Stuttgart (DE)

(72) Inventors: Florian Haag, Ellhofen (DE); Martin Marquart, Reichenbach (DE); Nikolas Loeffelmann, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 133 days.

(21) Appl. No.: 17/202,958

(22) Filed: Mar. 16, 2021

(65) Prior Publication Data

US 2021/0387608 A1    Dec. 16, 2021

(30) Foreign Application Priority Data

Jun. 16, 2020    (DE) .......................... 102020207434.8

(51) Int. Cl.
  *B60T 17/22*  (2006.01)
  *B60T 13/16*  (2006.01)
  (Continued)

(52) U.S. Cl.
  CPC ............ *B60T 17/225* (2013.01); *B60T 13/16* (2013.01); *B60T 17/08* (2013.01); *B60T 17/221* (2013.01);
  (Continued)

(58) Field of Classification Search
  CPC .... B60T 17/221; B60T 17/225; B60T 13/142; B60T 13/16; B60T 13/161; B60T 17/08; B60T 2270/406; G01M 3/26; G01M 3/32; G01M 3/3236; G01M 3/3245; G01F 23/0007
  See application file for complete search history.

(56) References Cited

U.S. PATENT DOCUMENTS

| 5,041,812 A | * | 8/1991 | Misaizu | ................ B60T 17/225 |
| | | | | 73/307 |
| 2013/0036814 A1 | * | 2/2013 | Neumann | ............. B60T 17/225 |
| | | | | 73/290 R |

(Continued)

FOREIGN PATENT DOCUMENTS

| DE | 102016009879 A1 | * | 2/2018 | ............. F15B 19/00 |
| DE | 102019215418 A1 | * | 4/2021 | |
| WO | WO-2010026465 A1 | * | 3/2010 | ............ B60T 13/662 |

*Primary Examiner* — Thomas J Williams
(74) *Attorney, Agent, or Firm* — Norton Rose Fulbright US LLP; Gerard Messina

(57) ABSTRACT

A method for ascertaining an available fluid volume in a tank for brake fluid of a braking system. The braking system includes a pressure generator fluidically connected to the tank on the one hand and to at least one brake circuit on the other hand, which is activatable for generating a hydraulic pressure in the braking system as brake fluid is withdrawn from the tank. A drop below a predefined limiting value for a fill level of the brake fluid in the tank is monitored with the aid of a binary sensor assigned to the tank. It is provided that an actuation of the pressure generator is monitored and that the available fluid volume is ascertained as a function of the actuation of the pressure generator when the instantaneous fill level drops below the limiting value.

12 Claims, 1 Drawing Sheet

(51) Int. Cl.
*G01F 23/00* (2022.01)
*G01M 3/26* (2006.01)
*B60T 17/08* (2006.01)

(52) U.S. Cl.
CPC ........... *G01F 23/0007* (2013.01); *G01M 3/26* (2013.01); *B60T 2270/406* (2013.01)

(56) References Cited

U.S. PATENT DOCUMENTS

| | | | |
|---|---|---|---|
| 2016/0059839 A1* | 3/2016 | Nanahara | B60T 13/146 73/39 |
| 2018/0050678 A1* | 2/2018 | Wolff | B60T 13/741 |
| 2021/0387608 A1* | 12/2021 | Haag | G01F 23/0007 |

* cited by examiner

METHOD AND DEVICE FOR ASCERTAINING AN AVAILABLE FLUID VOLUME, BRAKING SYSTEM

CROSS REFERENCE

The present application claims the benefit under 35 U.S.C. § 119 of German Patent Application No. DE 102020207434.8 filed on Jun. 16, 2020, which is expressly incorporated herein by reference in its entirety.

FIELD

The present invention relates to a method and to a device for ascertaining an available fluid volume in a tank for brake fluid of a braking system, the braking system including a pressure generator fluidically connected on the one hand to the tank and on the other hand to at least one brake circuit, which is activatable for generating a hydraulic pressure in the brake circuit as brake fluid is withdrawn from the tank, and a drop below a predefined limiting value for a fill level of the brake fluid in the tank being monitored with the aid of a binary sensor assigned to the tank.

The present invention further relates to a braking system including a tank for brake fluid, including at least one brake circuit and including a pressure generator fluidically connected on the one hand to the tank and on the other hand to the at least one brake circuit, which is designed to generate a hydraulic pressure in the at least one brake circuit as brake fluid is withdrawn from the tank, a binary sensor being assigned to the tank for monitoring a fill level of the brake fluid in the tank.

BACKGROUND INFORMATION

Hydraulic braking systems are frequently equipped with a tank or fluid reservoir, in which the brake fluid for the braking system is stored. To ensure that the brake fluid does not drop below a predefined limiting volume, the fill level of the brake fluid in the tank is monitored with the aid of a fill level sensor. For reasons of cost, a binary sensor is situated in this case at the tank, which monitors a drop of the fill level below a predefined limiting value. If the fill level drops below the predefined limiting value, this is recognized and reported by the binary sensor. However, an indication of the fluid volume actually present is not able to be provided in this way.

SUMMARY

In accordance with an example embodiment of the present invention, a quantified indication of the fluid volume actually present or extendable in the braking system may be provided despite the use of a binary sensor for monitoring the fill level of the brake fluid in the tank, without a complex sensor technology having to be used for such purpose. According to the an example embodiment of the present invention, this is achieved by monitoring an actuation of the pressure generator, and by ascertaining the available fluid volume when the instantaneous fill level drops below the limiting value as a function of the actuation of the pressure generator. Thus, the present invention provides that the actuation of the pressure generator is monitored, as a result of which it may be established how large the hydraulic volume displaced by the pressure generator is from the tank to the braking system. As a function of the ascertained displaced hydraulic volume, it is establishable how far the fill level in the tank has fallen as a result of the actuation of the pressure generator. Depending on at which point in time the binary sensor reports or establishes the drop below the limiting value, the fill level in the tank before the actuation of the pressure generator is thus calculable as a function of the displaced volume and of the drop below the limiting value. This fill level, which is present in the tank before the actuation of the pressure generator is understood to be the available brake fluid volume. Thus, it is possible to establish in a simple manner the actually available fluid volume in the tank by using a binary sensor while taking the actuation of a pressure generator in the braking system into account, as a result of which, for example, an alert message may be output in a timely manner if the actual available fluid volume drops below a predefined limiting value.

The pressure generator is preferably monitored for a hydraulic actuation volume of brake fluid displaced by the pressure generator. While a monitoring of an actuation of the pressure generator is, generally, sufficient for estimating the available fill level, the accuracy of the estimation is improved by ascertaining the hydraulic actuation volume. The actuation volume, which is displaced by the pressure generator from the tank into the brake circuit is, given knowledge of the pressure generator used, calculable with little effort.

The pressure generator is preferably an actuatable hydraulic cylinder, in particular, a main brake cylinder of the braking system, including at least one displaceably mounted hydraulic piston, and the actuation volume is determined as a function of a displacement of the hydraulic piston. A displacement travel of the hydraulic piston is, in particular, monitored or ascertained as a function of the activation of the pressure generator and from which the displaced hydraulic volume is ascertained taking the front surface of the hydraulic piston into account.

According to one alternative specific embodiment of the present invention, the pressure generator is a drivable rotation pump and the actuation volume is ascertained as a function of the drive duration and rotational speed of the rotation pump. Given knowledge of the power data of the rotation pump, in particular, the delivery rate as a function of the rotation speed, the displaced hydraulic volume is also ascertainable with no major additional effort.

According to one preferred refinement of the present invention, the available fluid volume is determined as a function of the ascertained actuation volume and of a cross-sectional area of the tank. The displaced hydraulic volume is, in particular, divided by the cross-sectional area of the tank, resulting in the original fill level height of the brake fluid in the tank, which corresponds to the searched available fluid volume.

At least one valve, via which a reverse flow of brake fluid from the brake circuit into the hydraulic cylinder is prevented, is preferably situated downstream from the hydraulic cylinder, while the hydraulic piston is pushed back into an initial position as brake fluid is withdrawn from the tank. Because in the case of the hydraulic cylinder, hydraulic medium is not withdrawn or is unable to be withdrawn from the tank during the push process that generates a hydraulic pressure, a reverse flow of brake fluid from the brake circuit into the hydraulic cylinder when the piston is retracted into the initial position is preferably prevented with the aid of the valve. During the retraction, the hydraulic cylinder then draws brake fluid out of the tank and changes the fill level in the tank as a result. The hydraulic volume displaced overall in the hydraulic cylinder during the pushback of the hydraulic piston then corresponds to the delivered actuation volume of the pressure generator.

The method is preferably carried out regularly with the motor vehicle at a standstill, in particular, after each start-up of the motor vehicle and/or with each shutdown of the motor vehicle. This regularly ensures a monitoring of the braking system, which does not adversely affect the driving operation of the motor vehicle. The start-up of the motor vehicle in this case is understood to mean the starting of the motor vehicle (ignition on) and the shutdown is understood to mean the switching off of the motor vehicle (ignition off).

It is further preferably provided that for a function test of the binary sensor, an actuation volume is displaced by the pressure generator, as a result of which a drop below the limiting value in the tank should occur, and that a functional error of the binary sensor is determined if the binary sensor does not identify the drop below the limiting value. The pressure generator is thus activated in such a way that it displaces a sufficiently large actuation volume, which normally results in the fill level dropping below the predefined limiting value. If, however, this is not identified by the binary sensor, an error, in particular, of the binary sensor, is present.

In accordance with an example embodiment of the present invention a control unit is provided, which is configured specifically to carry out the method according to the present invention when used as intended.

A braking system according to an example embodiment of the present invention is distinguished by the device according to the present invention. This yields the previously cited advantages.

BRIEF DESCRIPTION OF THE DRAWINGS

Further advantages and preferred features and feature combinations result, in particular, from the disclosure herein.

The present invention is explained in greater detail below with reference to the figures.

DETAILED DESCRIPTION OF EXAMPLE EMBODIMENTS

Figure 1:
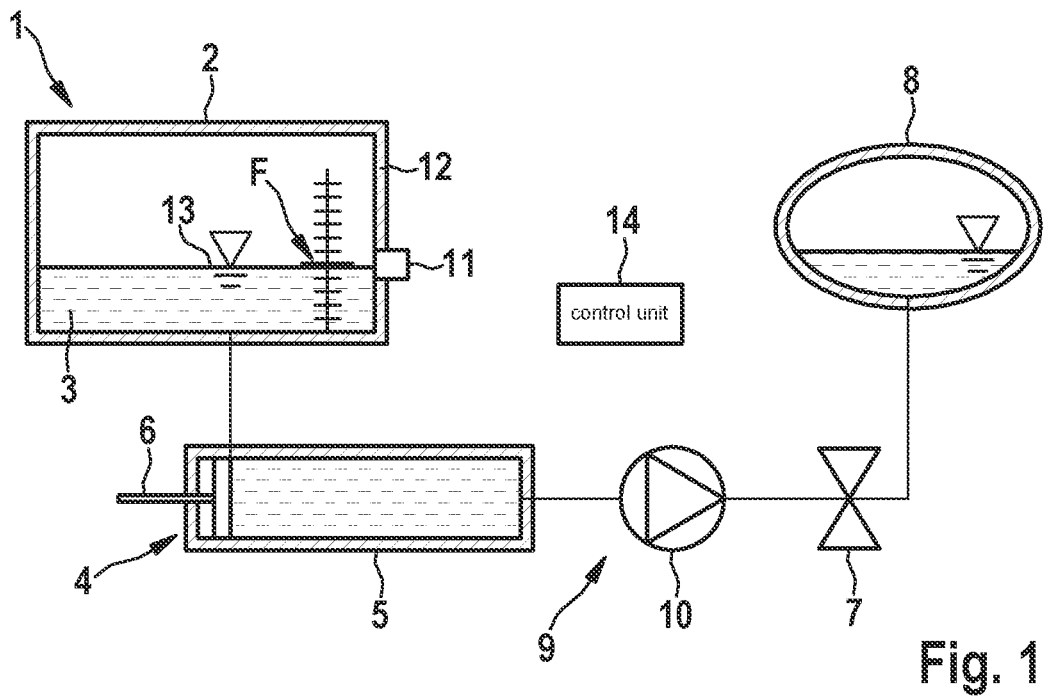
FIG. 1 shows a simplified representation of an advantageous braking system in accordance with an example embodiment of the present invention.

FIG. 1 shows a simplified representation of an advantageous braking system 1 of a motor vehicle not further represented herein. Braking system 1 includes a tank 2, which is used to receive and store a liquid braking means 3. Tank 2 is fluidically connected to a pressure generator 4 which, according to the present exemplary embodiment, is designed as hydraulic cylinder 5 including a hydraulic piston 6 displaceably mounted therein. Pressure generator 4 is fluidically connected on the output side with an activatable valve 7, which selectively unblocks or blocks the connection of pressure generator 4 to a brake circuit 8. Valve 7 is designed, for example as an electromagnetic switch valve. A further pressure generator 9 is optionally present, in addition to or as an alternative to pressure generator 4 which, according to the present exemplary embodiment, is designed as a rotation pump 10. If pressure generator 9 is also present, it is then advantageously connected between pressure generator 4 and valve 7.

Also assigned to tank 2 is a binary sensor 11. Binary sensor 11 is situated at a side wall 12 of the tank and outputs a first signal if brake fluid 3 is situated at the level of the binary sensor 11, and a second signal if brake fluid 3 is not situated in the area of binary sensor 11 so that, for example, only a gas volume, in particular, an air volume, is present at the level of binary sensor 11 in tank 2. Binary sensor 11 is situated at a level of side wall 12, which corresponds to a predefined limiting value F for a fill level of braking fluid 3 in tank 2. If the surface 13 of braking fluid 3 drops below predefined limiting value F, then binary sensor 11 changes its signal and thereby signals the drop of braking fluid 3 in tank 2 below the predefined fill level.

Braking system 1 further includes a control unit 14, which is connected at least by way of signaling with binary sensor 11, with pressure generators 4 and/or 9 as well as with valve 7. For reasons of clarity, the signal connections are not shown in FIG. 1.

Figure 2:
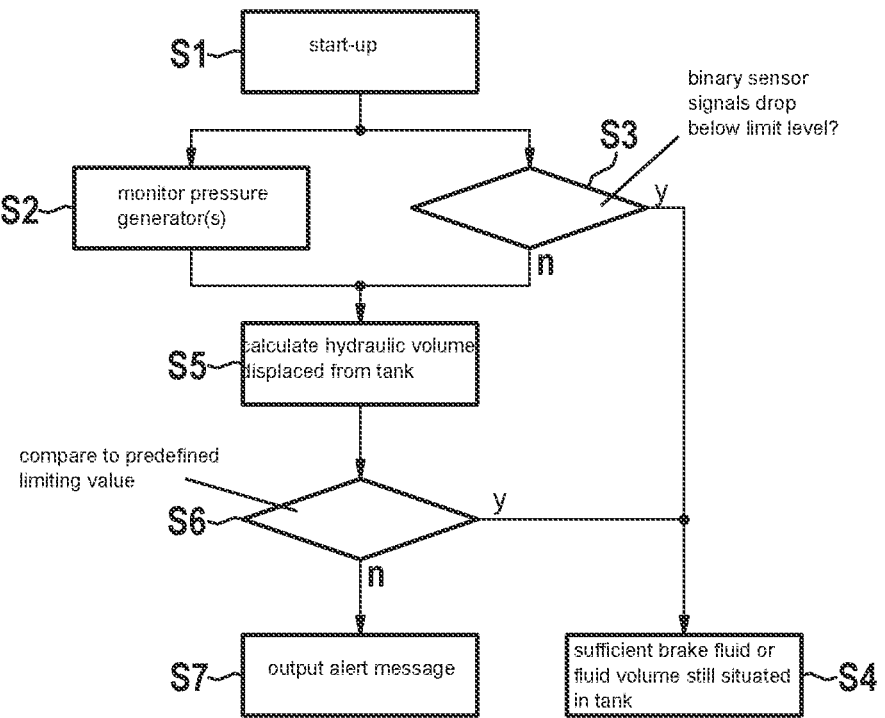
FIG. 2 shows a flowchart for explaining one advantageous method for ascertaining an available fluid volume in the braking system, in accordance with an example embodiment of the present invention.

Control unit 14 is designed to activate pressure generator 4 and/or 9 as well as valve 7 and to evaluate the signals of binary sensor 11. For this purpose, control unit 14, when used as intended in the motor vehicle or in the braking system 1, carries out the method symbolized by a flowchart in FIG. 2.

The method begins in a step S1 with the start-up (ignition on) of the motor vehicle. The pressure generator or generators 4, 9 present are subsequently monitored in step S2 for their actuation and, at the same time, the data of the binary sensor are monitored in a step S3. If it is established in step S2 that an actuation of at least one of pressure generators 4, 9 takes place, but fill level sensor 11 does not yet signal (y) in step S3 a drop below the limit level, then it is determined in a step S4 that sufficient brake fluid or a sufficient fluid volume is still situated in tank 2. If, however, it is identified that binary sensor 11 signals (n) a drop below the predefined fill level, then the hydraulic volume displaced from tank 2 in the direction of brake circuit 8 by pressure generator 4, 9 when actuated is calculated in a subsequent step S5 as a function of the detected actuation of respective pressure generator 4, 9 and of the point in time at which a drop below the limiting value has occurred. Given knowledge of the displaced hydraulic volume, the original fill level of tank 2 is calculated. For this purpose, the displaced hydraulic volume is, in particular, divided by the area of tank 2. This results in the original fill level as the level in tank 2. For this purpose, FIG. 1 shows, for example, the state of tank 2, at which binary sensor 11 signals or triggers a drop below limiting value F.

The original fill level of tank 2 ascertained in this way is compared with a predefined limiting value in a step S6 for the available fluid volume in braking system 1. If the calculated value does not drop below the predefined limiting value (y), then the sufficient fill level is determined in step S4 and motor vehicle 1 is operated as usual. If, however, it is ascertained in step S6 that the calculated available volume drops below (n) the limiting value, then an alert message, in particular, in an acoustic or visual form, is output to the driver of the motor vehicle in a subsequent step S7.

To ascertain the actuation volume, the displacement travel of piston 6 in hydraulic cylinder 5 is detected with respect to pressure generator 4 in order to calculate the displaced hydraulic volume taking into account the cross-sectional area of hydraulic cylinder 5 or the front surface of piston 6. In this case, it is preferably provided that the actuation volume is calculated when hydraulic piston 6 is displaced back into a retracted initial position after it has displaced hydraulic volume in brake circuit 8. For this purpose, valve 7 is closed when hydraulic piston 6 is retracted. The result of this is that pressure generator 4 draws brake fluid 3 from tank 2 in order to fill the volume in hydraulic cylinder 5 that has now become free. Thus, the actuation volume is not ascertained during the working stroke of hydraulic piston 6, but during the retraction.

With regard to pressure generator 9, the rotational speed and rotation duration of rotation pump 10, in particular, are monitored for ascertaining the actuation volume and, given knowledge of the power curve of rotation pump 10, the actuation volume is calculated.

The advantageous braking system 1 and the method described have the advantage that a path-resolved indication about the actually present fluid volume in the braking system is possible, even though only one binary sensor 11 is situated at tank 2. The method is advantageously carried out after each start-up of motor vehicle 1 and/or when shutting down the motor vehicle. The ascertained and calculated values are preferably permanently stored in order to record a profile of the ascertained fluid volume. If the fluid volume continually decreases, then it is concluded that a leak is present in braking system 1 and an alert message, for example, is output in order to be able to initiate countermeasures in a timely manner.

With advantageous braking system 1, it is also possible to monitor the operability of the fill level sensor or binary sensor 11. For this purpose, pressure generator 4 and/or 9 is/are activated to displace a hydraulic volume, which is so great that the fill level of brake fluid 3 in tank 2 should drop below limiting value F in tank 2. If binary sensor 11 fails to identify this, it therefore does not activate to establish that a malfunction of binary sensor 11 is present.

What is claimed is:

1. A method for ascertaining an available fluid volume in a tank for brake fluid of a braking system, the braking system including a pressure generator, fluidically connected to the tank and to at least one brake circuit, which is activatable for generating a hydraulic pressure in the braking system as brake fluid is withdrawn from the tank, the method comprising:
    monitoring for a drop below a predefined limiting value of a fill level of the brake fluid in the tank using a binary sensor assigned to the tank;
    monitoring an actuation of the pressure generator; and
    ascertaining the available fluid volume as a function of the actuation of the pressure generator when the fill level drops below the limiting value, wherein:
    the pressure generator is monitored for a hydraulic actuation volume of brake fluid displaced by the pressure generator, and
    the pressure generator is an actuatable hydraulic cylinder, the hydraulic cylinder being a main brake cylinder, including at least one displaceable hydraulic piston, and the actuation volume is determined as a function of a displacement of the hydraulic piston.

2. The method as recited in claim 1, wherein the available fluid volume is ascertained as a function of the ascertained actuation volume and of a cross-sectional area of the tank.

3. A method for ascertaining an available fluid volume in a tank for brake fluid of a braking system, the braking system including a pressure generator, fluidically connected to the tank and to at least one brake circuit, which is activatable for generating a hydraulic pressure in the braking system as brake fluid is withdrawn from the tank, the method comprising:
    monitoring for a drop below a predefined limiting value of a fill level of the brake fluid in the tank using a binary sensor assigned to the tank;
    monitoring an actuation of the pressure generator; and
    ascertaining the available fluid volume as a function of the actuation of the pressure generator when the fill level drops below the limiting value, wherein:
    the pressure generator is monitored for a hydraulic actuation volume of brake fluid displaced by the pressure generator, and
    the pressure generator is a driveable rotation pump, and the actuation volume is ascertained as a function of a drive duration and rotational speed of the rotation pump.

4. The method as recited in claim 3, wherein the available fluid volume is ascertained as a function of the ascertained actuation volume and of a cross-sectional area of the tank.

5. A method for ascertaining an available fluid volume in a tank for brake fluid of a braking system, the braking system including a pressure generator, fluidically connected to the tank and to at least one brake circuit, which is activatable for generating a hydraulic pressure in the braking system as brake fluid is withdrawn from the tank, the method comprising:
    monitoring for a drop below a predefined limiting value of a fill level of the brake fluid in the tank using a binary sensor assigned to the tank;
    monitoring an actuation of the pressure generator; and
    ascertaining the available fluid volume as a function of the actuation of the pressure generator when the fill level drops below the limiting value, wherein at least one valve, via which a reverse flow of brake fluid from the brake circuit into the hydraulic cylinder is prevented, is situated downstream from the hydraulic cylinder, while the hydraulic piston is pushed back into an initial position as brake fluid is withdrawn from the tank.

6. A method for ascertaining an available fluid volume in a tank for brake fluid of a braking system, the braking system including a pressure generator, fluidically connected to the tank and to at least one brake circuit, which is activatable for generating a hydraulic pressure in the braking system as brake fluid is withdrawn from the tank, the method comprising:
    monitoring for a drop below a predefined limiting value of a fill level of the brake fluid in the tank using a binary sensor assigned to the tank;
    monitoring an actuation of the pressure generator; and
    ascertaining the available fluid volume as a function of the actuation of the pressure generator when the fill level drops below the limiting value, wherein the method is carried out regularly with a motor vehicle at a standstill, after each start-up of the motor vehicle and/or with each shutdown of the motor vehicle.

7. A method for ascertaining an available fluid volume in a tank for brake fluid of a braking system, the braking system including a pressure generator, fluidically connected to the tank and to at least one brake circuit, which is activatable for generating a hydraulic pressure in the braking system as brake fluid is withdrawn from the tank, the method comprising:
    monitoring for a drop below a predefined limiting value of a fill level of the brake fluid in the tank using a binary sensor assigned to the tank;
    monitoring an actuation of the pressure generator; and ascertaining the available fluid volume as a function of the actuation of the pressure generator when the fill level drops below the limiting value, wherein available fluid volumes ascertainable via multiple implementations of the method are compared with one another, and a leak in the braking system is identified when decreasing fluid volumes are detected.

8. A method for ascertaining an available fluid volume in a tank for brake fluid of a braking system, the braking system including a pressure generator, fluidically connected to the tank and to at least one brake circuit, which is activatable for generating a hydraulic pressure in the braking system as brake fluid is withdrawn from the tank, the method comprising:
  monitoring for a drop below a predefined limiting value of a fill level of the brake fluid in the tank using a binary sensor assigned to the tank;
  monitoring an actuation of the pressure generator; and
  ascertaining the available fluid volume as a function of the actuation of the pressure generator when the fill level drops below the limiting value, wherein, for a functional test, an actuation volume is displaced by the pressure generator, as a result of which a drop below the limiting value in the tank should occur, and a functional error of the binary sensor is determined when the binary sensor does not identify the drop below the limiting value in the tank.

9. A device for ascertaining an available fluid volume in a tank for brake fluid of a braking system, the braking system including a pressure generator, fluidically connected to the tank and to at least one brake circuit, which is activatable for generating a hydraulic pressure in the braking system as brake fluid is withdrawn from the tank, and a drop below a predefined limiting value for a fill level of the brake fluid in the tank being monitored using a binary sensor assigned to the tank, the device comprising:
  a control unit configured to:
    monitor an actuation of the pressure generator, and
    ascertain the available fluid volume as a function of the actuation of the pressure generator when the fill level drops below the limiting value, wherein:
    the pressure generator is monitored for a hydraulic actuation volume of brake fluid displaced by the pressure generator, and
    the pressure generator is an actuatable hydraulic cylinder, the hydraulic cylinder being a main brake cylinder, including at least one displaceable hydraulic piston, and the actuation volume is determined as a function of a displacement of the hydraulic piston.

10. A braking system for a motor vehicle, comprising:
  a tank;
  at least one brake circuit;
  a pressure generator, connected to the tank and to the at least one brake circuit, and configured to generate a hydraulic pressure in the at least one brake circuit as brake fluid is withdrawn from the tank;
  a binary sensor assigned to the tank configured to detect a drop below a predefined limiting value for a fill level of the brake fluid in the tank; and
  a device including a control unit configured to:
    monitor an actuation of the pressure generator, and
    ascertain the available fluid volume as a function of the actuation of the pressure generator when the fill level drops below the limiting value, wherein:
    the pressure generator is monitored for a hydraulic actuation volume of brake fluid displaced by the pressure generator, and
    the pressure generator is an actuatable hydraulic cylinder, the hydraulic cylinder being a main brake cylinder, including at least one displaceable hydraulic piston, and the actuation volume is determined as a function of a displacement of the hydraulic piston.

11. A device for ascertaining an available fluid volume in a tank for brake fluid of a braking system, the braking system including a pressure generator, fluidically connected to the tank and to at least one brake circuit, which is activatable for generating a hydraulic pressure in the braking system as brake fluid is withdrawn from the tank, and a drop below a predefined limiting value for a fill level of the brake fluid in the tank being monitored using a binary sensor assigned to the tank, the device comprising:
  a control unit configured to:
    monitor an actuation of the pressure generator, and
    ascertain the available fluid volume as a function of the actuation of the pressure generator when the fill level drops below the limiting value, wherein:
    the pressure generator is monitored for a hydraulic actuation volume of brake fluid displaced by the pressure generator,
    the pressure generator is a driveable rotation pump, and
    the actuation volume is ascertained as a function of a drive duration and rotational speed of the rotation pump.

12. A braking system for a motor vehicle, comprising:
  a tank;
  at least one brake circuit;
  a pressure generator, connected to the tank and to the at least one brake circuit, and configured to generate a hydraulic pressure in the at least one brake circuit as brake fluid is withdrawn from the tank;
  a binary sensor assigned to the tank configured to detect a drop below a predefined limiting value for a fill level of the brake fluid in the tank; and
  a device including a control unit configured to:
    monitor an actuation of the pressure generator, and
    ascertain the available fluid volume as a function of the actuation of the pressure generator when the fill level drops below the limiting value, wherein:
    the pressure generator is monitored for a hydraulic actuation volume of brake fluid displaced by the pressure generator,
    the pressure generator is a driveable rotation pump, and
    the actuation volume is ascertained as a function of a drive duration and rotational speed of the rotation pump.

* * * * *